G. A. TUTTLE.
HARVESTER.
APPLICATION FILED JULY 5, 1907.

955,229.

Patented Apr. 19, 1910.
5 SHEETS—SHEET 1.

WITNESSES

INVENTOR
George A. Tuttle
BY
ATTORNEYS

G. A. TUTTLE.
HARVESTER.
APPLICATION FILED JULY 5, 1907.

955,229.

Patented Apr. 19, 1910.
5 SHEETS—SHEET 3.

WITNESSES

INVENTOR
George A. Tuttle
BY
Munn & Co
ATTORNEYS

UNITED STATES PATENT OFFICE.

GEORGE A. TUTTLE, OF RICHLAND, WASHINGTON.

HARVESTER.

955,229.  Specification of Letters Patent.  Patented Apr. 19, 1910.

Application filed July 5, 1907. Serial No. 382,332.

*To all whom it may concern:*

Be it known that I, GEORGE A. TUTTLE, a citizen of the United States, and a resident of Richland, in the county of Benton and State of Washington, have invented a new and Improved Harvester, of which the following is a full, clear, and exact description.

This invention has in view the provision of a harvester so constructed and arranged that it may be operated with a minimum amount of labor to cut the grain and transport it to threshing means, where it is threshed and thereafter separated from the straw and chaff, the latter being carried to a straw dump and the grain carried to an elevated position where it is delivered into bags or other receptacles. Such grain as is not separated from the straw is re-delivered to the threshing means and again passed through the machine. The arrangement of the machine further provides for the advance of the cutting means directly at the front thereof and ahead of the draft animals for drawing the machine over the field, thus avoiding the likelihood of the grain being trampled down by said animals before it is cut, and of throwing the cutting means at one side of the machine as is usual in harvester construction.

Reference is to be had to the accompanying drawings forming a part of this specification, in which similar characters of reference indicate corresponding parts in all the figures.

Fig. 12 is a section through the conveying means for carrying the partially threshed grain and straw to the threshing means.

Figures 7, 8, 9, 10, 11, 14, 15:
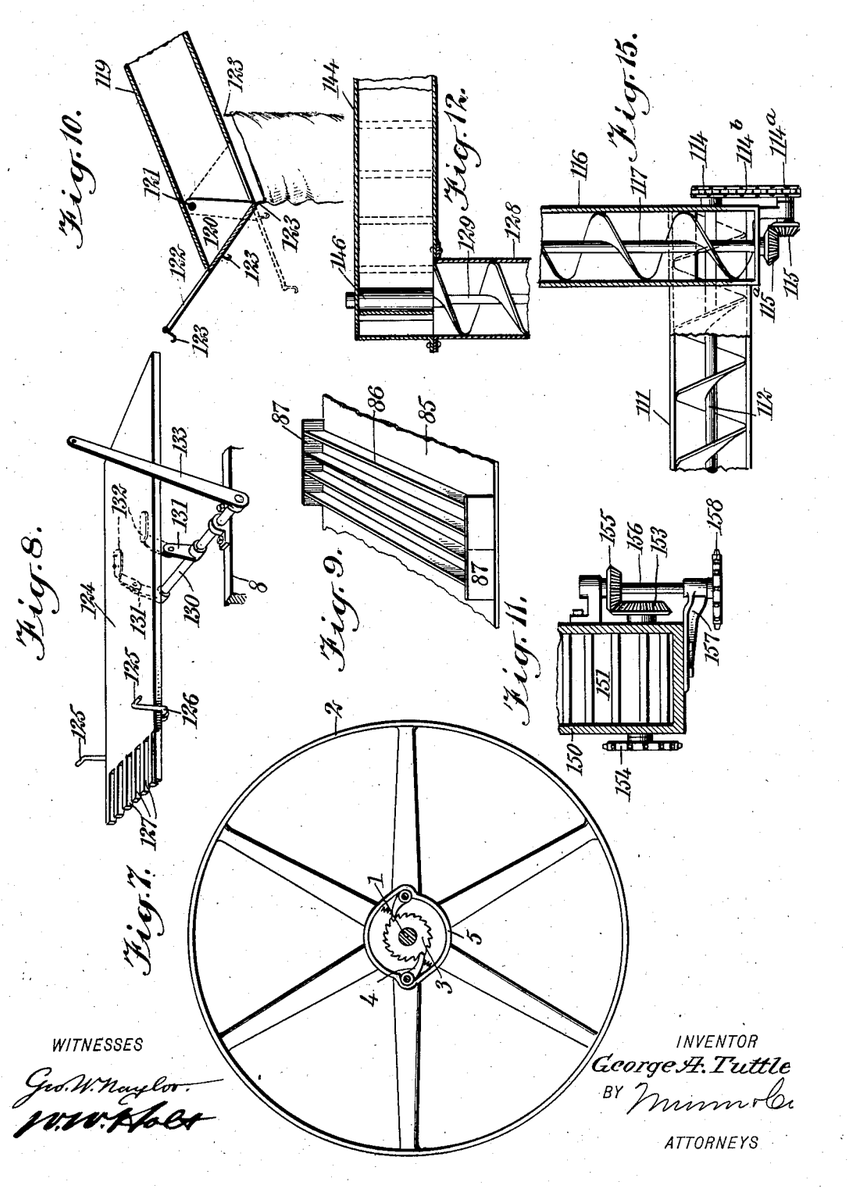
Fig. 7 is an inside view of one of the driving wheels showing the axle in section.
Fig. 8 is a perspective view of the riddle and operating connection.
Fig. 9 is a fragmentary perspective view of the elevator leading from the threshing means.
Fig. 10 is an enlarged central, sectional view of the grain-discharging chute.
Fig. 11 is a section on the line 11—11 of Fig. 5.
Fig. 15 is a section through a fragment of the grain delivering elevator.

Referring to the drawings, 1 indicates a driving axle which has journaled thereon near opposite ends, wheels 2 which support the main body of the machine. Adjacent to the wheels 2, preferably at the inside, are fixed to the axle 1, ratchet wheels 3, as shown in Fig. 7, which are normally engaged at opposite sides by spring-pressed pawls 4 pivotally mounted and inclosed by a protective casing 5. This construction admits of one of the wheels 2 traveling faster than the other, as when turning the machine around.

Figures 5, 6, 16:
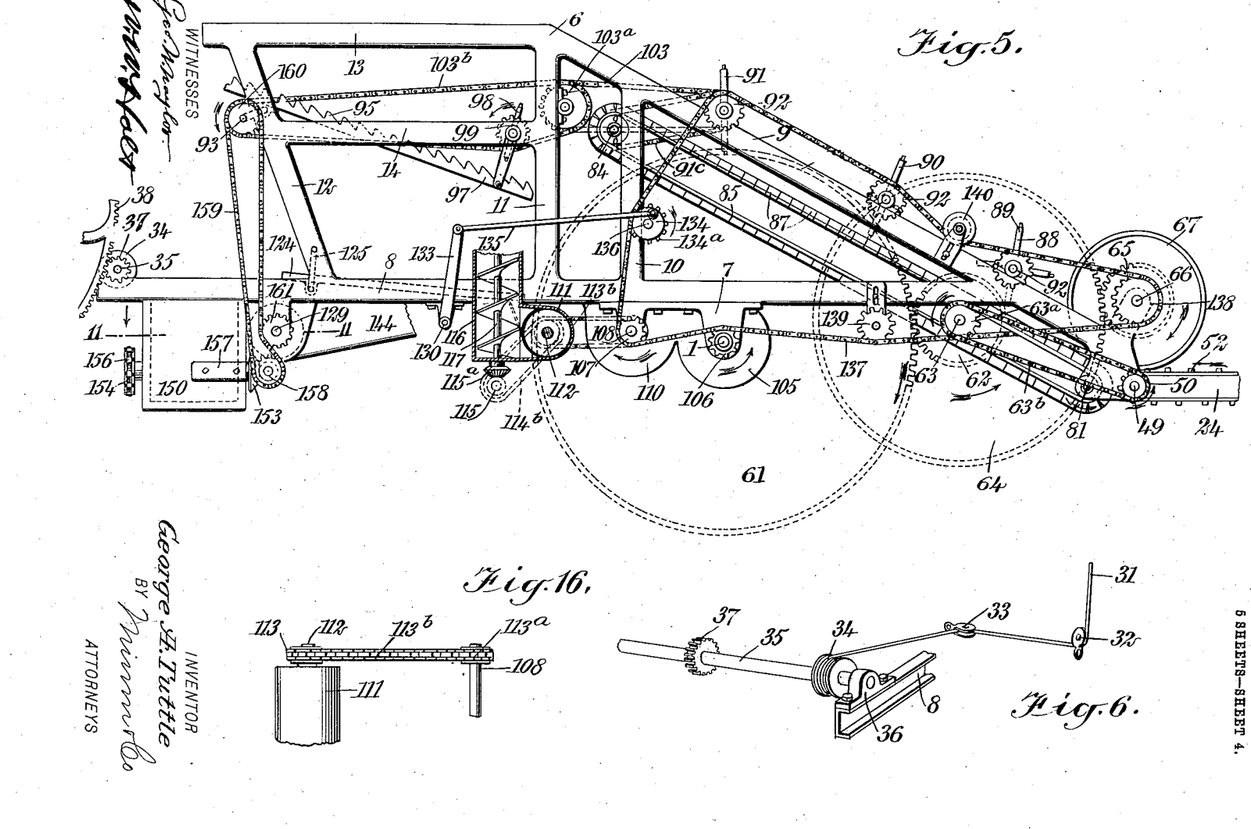
Fig. 5 is a fragmentary side elevation of the main frame, showing the arrangement and construction of the driving mechanism.
Fig. 6 is a perspective view of a fragment of the operating mechanism of the reel and sickle.
Fig. 16 is a detail of construction hereinafter more fully described.

The main frame of the machine comprises vertical truss frames 6 supported on the axle 1 at each side of its center, in bearings 7 shown in Fig. 5. The frames 6, as best shown in Fig. 5, are each made up of a horizontal tie-beam 8 and a forwardly sloping truss beam 9. These beams are suitably connected and supported by posts 10 and 11 and a brace 12 connecting the beam 8 with a horizontal extension 13 of the beam 9. The brace 12 is also directly connected with the post 11, by a crossbar 14.

Figures 1, 2, 13:
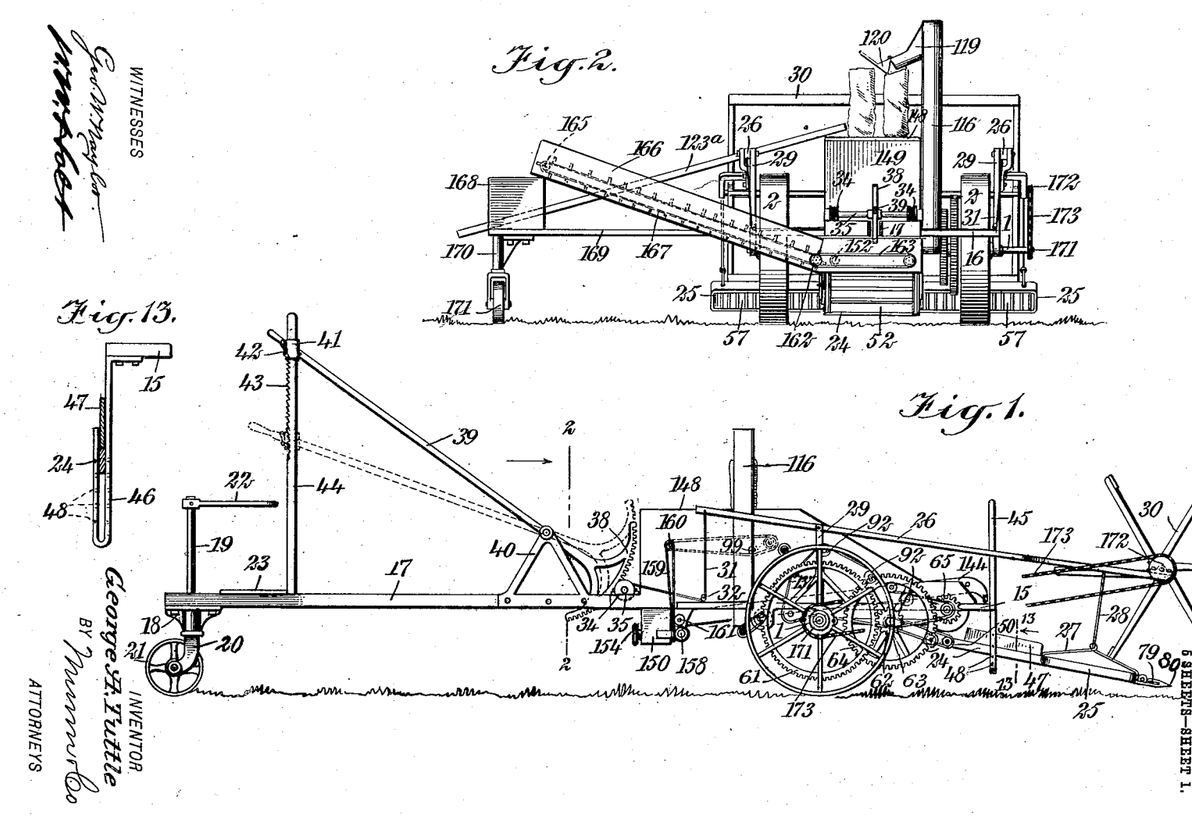
Figure 1 is a side elevation of the machine complete.
Fig. 2 is a section on the line 2—2 of Fig. 1, looking in the direction of the arrow.
Fig. 13 is a fragmentary, sectional view substantially on the line 13—13 of Fig. 1, looking in the direction of the arrow.

At each side of the truss frames 6 are rigidly attached in any suitable manner to the tie-beams 8, horizontal and substantially rectangular frames 15, said frames being journaled on the axle 1 at the outside of the wheels 2, and are connected together at the rear of the machine by a crossbar 16. The crossbar 16 is rigidly connected at its center, as shown in Fig. 2, by a tongue 17 extending some distance rearwardly and longitudinally of the machine. The outer end of this tongue is provided with a suitable bearing 18, as shown in Fig. 1, in which is journaled the vertical stem or shaft 19 of a fork 20, the latter carrying a steering wheel 21 journaled therebetween. At the upper end of the shaft 19 is fixed an arm 22 adapted to be operated from a platform 23 supported on the tongue 17.

Figures 3, 14:
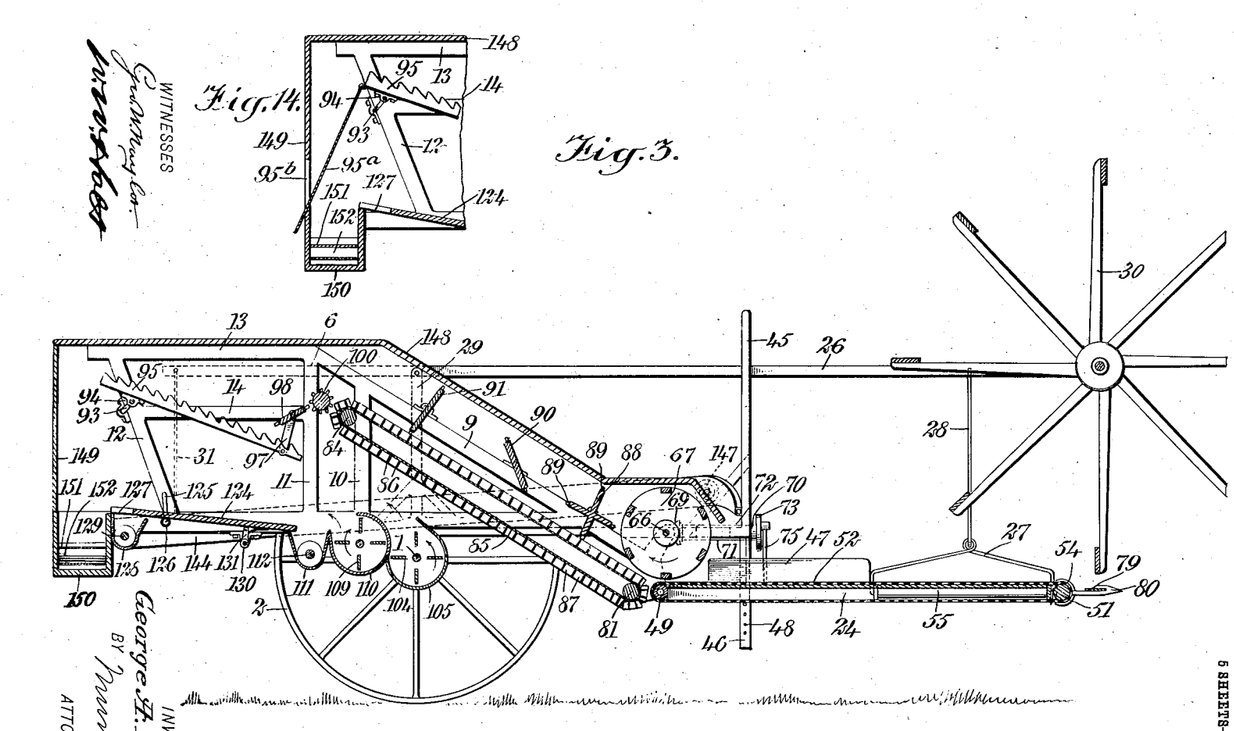
Fig. 3 is a central, longitudinal section through the forward part of the machine, on an enlarged scale.
Fig. 14 is a longitudinal sectional view through the rear end of the machine casing, showing a slightly modified construction.
Figure 4:
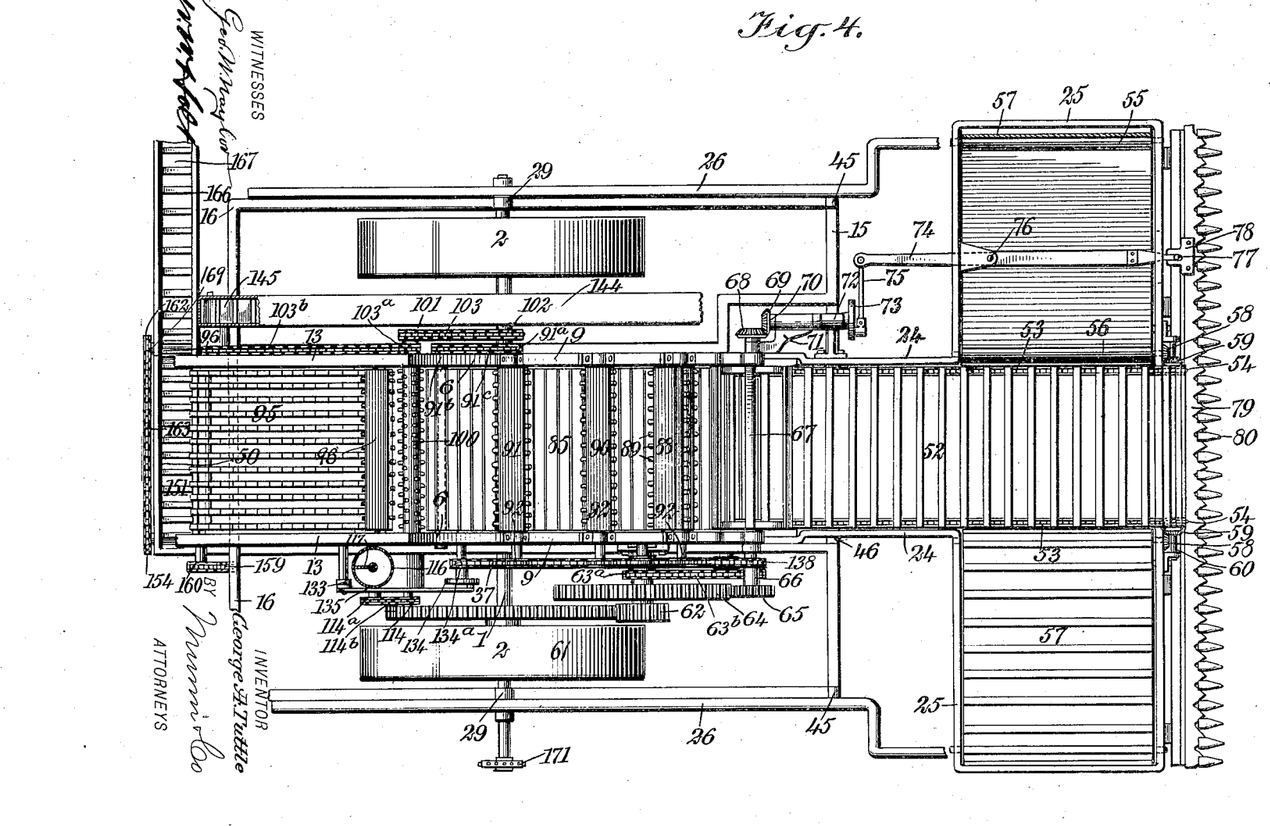
Fig. 4 is a plan of the forward part of the machine partly in section and with the upper casing or covering removed in order that the construction thereunder may be clearly disclosed.

Pivotally connected to the lower and forward end of each of the vertical frames 6 is a sickle frame 24 having an extension 25 at each side of its forward end, as shown in Fig. 4, which are supported from near the outer ends of levers 26 through the intermediary of bails 27 and links 28, as shown in Fig. 3. The levers 26 are pivotally supported at the upper end of standards 29 rigidly connected with the outer horizontal frames 15, as shown in dotted outline in Fig. 3, and in full lines in Fig. 4. The outer extremities of the levers 26 provide bearings in which is journaled a reel 30 of the usual or any preferred construction, said reel being positioned directly above the outer side of the extensions 25 and extending the full length thereof. The levers 26 are extended at the rear of the machine beyond their pivotal connections, as shown in dotted outline in Fig. 3, where they are connected by flexible lines 31, the latter passing around pulleys 32 and 33 carried by the main frame, and thereafter to drums 34 fixed to a cross shaft 35 journaled in bearings 36, which are supported at the rear ends of the tie-beams 8. This construction is best shown in Fig. 6. Fixed to the center of the shaft 35 is a pinion 37 in mesh with an arc 38 carried by a lever 39, said lever being pivotally supported in suitable supports 40 rising from the tongue 17, as shown in Fig. 1. The outer end of the lever 39 is slidably connected with a sleeve 41 carrying a spring-pressed pawl 42 normally engaging teeth 43 at one side of a standard 44, said standard being rigidly secured in any suitable manner to the tongue 17. It is obvious from this construction that a single operator standing on the platform 23 can guide the machine by working the arm 22 and at the same time control the relative height of the reel 30 and sickle frame 24, by regulating the lever 39.

At the forward and outer corners of the frames 15 are carried standards 45, acting as guides and preventing wabbling of the levers 26. At the opposite and inner corners of said frames 15 are suspended hooks 46, forming guide-ways for the frame 24, the latter supporting on their upper edge, sideboards 47 as shown in Figs. 1 and 13. The hooked ends 46 of the standards 45 are provided with alining perforations 48 through which pins may be passed for holding the sickle frame at any required elevation.

The pivotal connection of the sickle frame with the vertical truss frames above referred to, is formed by the outer reduced ends of a roller 49, one of said ends being extended and having a sprocket wheel 50 fixed thereto. A similar roller 51, shown in Fig. 3, is journaled at the opposite and outer end of the frame 24, and is connected with the roller 49 by an apron 52, the opposite edges of said apron being constructed with chains 53 which intermesh with sprocket wheels 54 fixed at the opposite ends of the rollers. As shown in Fig. 4, the extensions 25 of the frame 24 have journaled in the outer ends rollers 55, and adjacent to the apron 52, rollers 56, said rollers receiving and supporting aprons 57, which are, as also the apron 52, provided with the usual crossbars, as clearly shown in Fig. 4. The forward reduced ends of the rollers 56 are provided with bevel pinions 58 intermeshing with similar pinions 59 fixed at the opposite end of a shaft 60 journaled in suitable bearings carried at the forward side of the extensions 25.

Fixed to the axle 1 and adjacent to one of the wheels 2, is a large gear 61, which meshes with a somewhat smaller gear 62 fixed to the outer end of a shaft 63, the latter being journaled in bearings carried by the tie beams 8. Also fixed to the shaft 63 is a sprocket wheel 63ª and a large gear 64, the sprocket wheel being connected with the sprocket wheel 50 by a chain 63ᵇ and the said gear 64 being in mesh with a gear 65 fixed at the end of a shaft 66. Fixed to the shaft 66 between the truss frames 6, is a threshing cylinder 67 of the usual or any preferred construction. The shaft 66 is extended at the opposite side of the machine, where it has fixed thereto a bevel pinion or gear 68, meshing with a similar pinion 69 carried at the inner end of a shaft 70. The shaft 70, as also the shaft 66 at this side of the machine, are journaled in an angular bracket 71, which provides for the pivotal movement of the frame 24 and maintains the gears 68 and 69 in mesh. The opposite end of the shaft 70 is journaled in a bracket 72 projecting from the frame 24, and has fixed adjacent thereto a crank or crank disk 73, the latter carrying a crank pin which is connected to a lever 74 through the intermediary of a link 75. The lever 74 passes transversely through the adjacent extension 25 between the apron 57 supported thereby, and is pivotally connected at the inside of the extension to a bracket 76. The opposite and forward end of the lever 74 passes through a slot at the front of the extension 25, as shown in dotted outline in Fig. 4, and pivotally engages at 77 in a bracket 78 fixed to a sickle bar 79, the latter being slidably mounted in a slotted finger bar 80 suitably secured at the front of the frame 24 in any suitable manner.

Journaled in bearings carried by the main frame adjacent to the roller 49, are the reduced ends of a roller 81, which is connected with a roller 84, having its outer reduced ends journaled in bearings carried at the upper portions of the posts 10, by an apron 85, providing an elevator, which leads from the threshing cylinder 67, as shown in Fig. 3. The upper face of the apron 85 forming said elevator, is provided with trough-shaped buckets consisting of cross strips 86 preferably equally spaced apart, as shown in Fig. 9, each adjacent pair of strips being connected by end pieces 87, the latter forming one-half of the end of the next adjacent bucket, as clearly disclosed in said figure.

Adjacent to the threshing cylinder 67, is journaled in bearings carried by the truss beams 9, a beater 88, preferably having four blades, which are provided at the edges thereof with projecting pins 89. Also journaled in bearings carried by the truss beams 9, are beaters 90 and 91, each preferably consisting of a single blade with pins projecting from opposite edges corresponding to the pins 89 of the beater 88. These beaters operate when the machine is driven, to partially assist in threshing out the grain and arranging it and the straw in the buckets carried by the elevator underneath. The outer reduced ends of the beaters have fixed thereto alining sprocket wheels 92, as shown in Fig. 5, the beater 91 being provided with an additional sprocket wheel 91$^a$ at the opposite side of the machine which is connected with a sprocket wheel 91$^b$ carried by the roller 84, by a chain 91$^c$.

Journaled in bearings at the rear ends of the frames 6, preferably on the braces 12, is a shaft 93 having a crank 94 at its center revolubly mounted in a bearing fixed near one end, and to the under face of a straw rack 95. At one side of one of the frames 6, the shaft 93 is extended and has fixed thereto a sprocket wheel 96 shown in Fig. 4. The straw rack 95, as shown in Figs. 4 and 5, is constructed on its upper face with a series of toothed strips longitudinally arranged, with the teeth of said strips inclined rearwardly, whereby as the rack is oscillated as hereinafter described, the straw and chaff will be worked over its rear end. At the forward end of the rack 95, links 97 pivotally connect it with the reduced ends of a beater 98, preferably constructed the same as the beaters 90 and 91. One of the reduced ends or journals of the beater 98 is extended to the outside of one of the frames 6, where it has secured thereto a sprocket wheel 99, as shown in Fig. 5. Bridging the space between the beater 98 and the elevator leading to the threshing cylinder, is a roller 100 having a series of pins projecting from its circumference, which receive the straw and chaff from said elevator and discharge it over the beater 98 to the straw rack 95. The action of this roller 100 and the beater 98 threshes out the major part of such grain as remains unthreshed after leaving the elevator. The outer reduced end of the roller 100 is provided with a sprocket wheel 101, in alinement with a sprocket wheel 102, carried by the beater 91 and connected therewith by a chain 103. The roller 100 also carries a sprocket wheel 103$^a$, over which passes a chain 103$^b$, connecting it with the sprocket wheels 96 and 99.

Fixed between the frames 6 concentric to the axle 1, are the blades of a fan 104 inclosed by a casing 105 having an opening on its upper rear face, as shown in Fig. 3. The blades of this fan are in fixed relation to a sprocket wheel 106, shown in Fig. 5. A sprocket wheel 107 fixed to one end of a shaft 108, is in alinement with the sprocket wheel 106, said shaft 108 being journaled in bearings supported from the tie bars 8 and having blades of a fan 109 secured thereto between said bars. A casing 110 surrounding the blades of the fan 109, is arranged adjacent to the fan 104, and is open at the upper rear side and assists the fan 104 in discharging a blast of air underneath and over the straw rack, as indicated by the arrows in Fig. 3. Adjacent to the casing 110 and connected therewith, is a conveyer comprising a trough 111 arranged between the frames 6, in which operates a screw 112, said screw having fixed at one end to the outside of the adjacent frame 6, a sprocket wheel 113, as shown in Fig. 16, which connects with a sprocket wheel 113$^a$ by a chain 113$^b$. Also fixed to the screw 112, as shown in Fig. 15, is a sprocket wheel 114, connected with a sprocket wheel 114$^a$ by a chain 114$^b$, the latter driving through the bevel gears 115 and 115$^a$, an elevator comprising a vertical casing 116, in which operates a screw 117, the said elevator connecting with the conveyer casing 111 and screw 112 at its lower end. The casing 116 connects with an inclined chute 119 overhanging the center of the machine, as shown in Fig. 2. The construction of the outer end of this chute, which is shown on an enlarged scale in Fig. 10, embodies a section 120 pivoted on a pin 121. This section, as shown, comprises triangular sides joined to an extended bottom having an opening 122 cut through its outer end. Hooks 123 are fixed at each side of the opening 122, to the bottom of said section and also at the opposite end of said bottom and to the bottom of the chute. By this arrangement, two bags may be suspended in the path of the discharge of the chute at the same time, as indicated in Fig. 2. As one of said bags or other receptacle is filled and removed from the hooks, it is slid down a chute 123$^a$, and the outer empty bag, through the action of gravity, drops with the section 120 in alinement with the chute and receives the grain therefrom through the opening 122.

Arranged underneath the straw rack 95 is a riddle 124, which is suspended at its rear end by crank arms 125 journaled in 13 suitable bearings in the brace 12. The crank arms 125 are arranged at the opposite ends of a shaft 126 journaled in bearings carried by the under face of the riddle, as best shown in Figs. 3 and 8. The rear end of the riddle is constructed with a series of slots or other coarse openings 127, which permits bits of straw and unthreshed grain to drop through into a trough 128, having a screw 129 revolubly mounted therein and providing a screw conveyer. As shown in Fig. 3, the riddle inclines forwardly and downwardly, discharging into the trough 111, and is supported at a point intermediate its length on a shaft 130, through the intermediary of arms 131 pivotally attached to brackets 132 secured to the riddle on its under face. The shaft 130 is journaled in bearings carried by the tie beams 8, and has secured to its outer end an arm 133, said arm being connected to a crank disk 134, by a link 135, this construction being best shown in Figs. 4 and 5. The disk 134 is fixed to a shaft 136 journaled in a suitable bearing carried by the post 10. Also fixed to the shaft 136 adjacent to and on the inside of the crank disk 134, is a sprocket wheel 134ª shown in Fig. 5. This sprocket wheel, as also the sprocket wheels 92, 106 and 107 are driven by a chain 137 passing over a sprocket wheel 138 fixed to the shaft 66 of the cylinder 67. The chain 137 also passes over an adjustable sprocket wheel 139 in the nature of an idler, as clearly shown in Fig. 5, which in connection with the sprocket wheel 107, enforces the chain 137 to at all times be in substantial engagement with the sprocket wheel 106. The chain 137 also passes under a grooved wheel 140 adjustably carried by the beam 9, which provides for the tightening of the chain to the required tension.

The screw conveyer comprising the trough 128 and screw 129, discharges into a conveyer consisting of a conduit 144 arranged at one side of the machine and having an apron or other endless belt 145 movably mounted therein. For this purpose one end of the screw conveyer is extended and provided with a roller 146 over which said belt passes, as best shown in Fig. 12. The opposite end of this belt passes over a roller 147 journaled at the forward end of the conduit, as shown in dotted outline in Fig. 3. As also shown in this figure, the conduit 144 is directed over the apron 52 and discharges bits of unthreshed grain and straw thereon, which are afterward returned through the threshing mechanism.

As best shown in Fig. 3, the threshing cylinder, beaters, etc. are covered over with a casing 148, which is provided with a vertical wall 149 at the rear of the frame 6, said wall alining with the rear edge of a trough 150 arranged adjacent to the trough 128.

Within the trough 150 is provided a horizontal apron 151 passing over rollers 152, having the opposite reduced ends thereof journaled in suitable bearings carried by said trough 150. The roller 152 adjacent to the driving side of the machine has fixed to the extended reduced ends thereof a bevel pinion 153 and a sprocket wheel 154, this construction being better shown in Fig. 11. Meshing with the pinion 153 is a similar pinion 155 fixed to a short shaft 156 journaled in the outer end of a bracket 157 fixed to the adjacent end of the trough 150. The opposite end of the shaft 156 carries a sprocket wheel 158, which is driven by a chain 159 passing over a sprocket wheel 160 fixed to the outer end of the crank arm 93, said chain also engaging with a sprocket wheel 161 fixed to one end of the screw 129. The sprocket wheel 154 is connected to a similar sprocket wheel 162, by a chain 163, said sprocket wheel 162 being fixed to the outer reduced end of a roller 164, as shown in Fig. 2. The roller 164, as also a roller 165, are journaled in the opposite ends of a trough 166, forming in connection with an apron 167, an elevator which receives the straw from the apron 151 and discharges it into a straw dump 168, said straw dump being in the nature of a receptacle supported at the outer end of a beam 169, the opposite end of this beam being connected to the frame 6 in any suitable manner. For supporting the outer end of the beam 169 is arranged under the dump 168, a fork 170, having a wheel 171 journaled therebetween. For driving the reel 30, a sprocket wheel 171 is fixed to the extended end of the axle 1, and is connected with a sprocket wheel 172 fixed to the axis of said reel, by a chain 173, this construction being best shown in Figs. 1 and 2.

In Fig. 14 I have shown a modified construction at the rear of the casing in which the straw rack 95 is provided with a pivotally suspended leaf 95ª which passes through an opening 95ᵇ in the rear wall 149 and delivers the straw through said opening instead of on the conveyer below.

In the operation of the machine, as it is driven forward as by draft animals hitched in any suitable manner to the tongue 17, all of the working parts are set in motion by the mechanism described. The operator standing on the platform 23 controls the direction of movement of the harvester and also regulates the elevation of the sickle bar, as described. As the grain is cut, it is thrown by the reel on the aprons 57 and 52, the latter transporting it to the threshing cylinder, which, in connection with the beaters 88, 90 and 91 thresh out the grain which is collected, as also the straw, in the buckets of the adjacent elevator. The major portion of the straw is carried by the roller 100 discharging on the beater 98 to the straw rack 95, a portion of the straw and the threshed grain falling into the trough 111. The currents of air directed by the fans 104 and 109 drive such bits of straw and chaff as fall with the grain, rearwardly into the trough 150. The grain falling on the riddle 124 is, by reason of its oscillation, worked into the trough 111 and thereafter carried by the screw 112 to the elevator arranged at one end thereof, to the chute 119, where it is sacked, as hereinbefore described. Such bits of straw and chaff containing grain as pass through the slots 127 of the riddle, drop into the trough 128, and are carried by the screw 129 operating therein, to the apron 145, the latter transporting the straw and chaff through the conduit 144 and discharging it upon the apron 52, said apron conveying this partially threshed grain to the threshing means. The straw received by the rack 95 is, by reason of the teeth and the oscillations of the latter, assisted by the air currents from the fans, carried over the rear end of the rack onto the apron 151 in the trough 150. This apron, as aforesaid, discharges on the elevator apron 167, the latter emptying into the straw dump 168.

Although the construction as described is the preferred embodiment of my invention, it is obvious that the same may be materially changed without departing from the spirit of the same, as defined in the annexed claims.

Having thus described my invention I claim as new and desire to secure by Letters Patent:

1. In a combined harvesting and threshing machine, in combination, a main frame, a tongue rigidly connected to and extending at the rear of the main frame, a second frame pivotally connected at the forward end of the main frame, a sickle carried at the forward end of the pivoted frame, conveying means carried by the second frame adjacent to the sickle, levers pivotally connected to the main frame, a reel journaled on said levers and arranged over the sickle, means connecting said levers with the pivoted frame, a drum journaled on the main frame, a flexible connection between the inner end portions of the levers and the drum, and means arranged adjacent to said steering means operable to revolve the drum, whereby the relative elevation of the reel and pivoted frame are regulated.

2. In a combined harvesting and threshing machine, a main frame, a threshing mechanism carried by the main frame, an auxiliary frame arranged in advance of the main frame, cutting means carried by the second frame, a shaft pivotally connecting the inner end of the auxiliary frame to the forward end of the main frame, and having a roller, and an apron arranged between the cutting means and threshing mechanism, passing over said roller.

3. In a combined harvesting and threshing machine, in combination, a main frame, a second frame pivotally connected at the front thereof, conveying means carried by said second frame, a sickle carried at the front of the pivoted frame, standards fixed at each side of the main frame, levers pivotally connected to the standards, a reel journaled in the outer ends of said levers operating over said sickle, means connecting the levers with the pivoted frame, and means for simultaneously operating said levers whereby the relative elevation of the sickle and reel are controlled.

4. In a combined harvesting and threshing machine, in combination, a main frame, a second frame pivotally connected to the forward end thereof, a sickle carried by the pivoted frame, standards fixed to the main frame, levers pivoted to said standards, means directly connecting the levers with the pivoted frame, a reel journaled on said levers over the sickle, means for simultaneously operating said levers whereby the relative elevation of the reel and sickle is controlled, and standards carried by the main frame for guiding said levers and holding the same against side-movement.

5. In a combined harvesting and threshing machine, in combination, a main frame, a second frame pivotally connected at the front thereof, a sickle carried by said second frame, levers pivotally supported from the main frame, a reel journaled in said levers over the sickle, means connecting the levers with the pivoted frame whereby said frame is supported therefrom, and independent means for supporting said frame from the main frame.

6. In a combined harvesting and threshing machine, in combination, a main frame, a second frame pivoted at the forward end thereof, a sickle carried at the forward end of said second frame, and means for supporting the pivoted frame comprising a hooked bar having apertures therein depending from the main frame.

7. In a combined harvesting and threshing machine, in combination, a main frame, a second frame pivotally connected at the forward end thereof, a sickle carried by said second frame, levers pivotally supported from said main frame, a reel supported at the outer ends of said levers over said sickle, means connecting the pivoted frame with the levers, a shaft transversely journaled on the main frame, drums carried by said shafts, flexible connections between the drums and the levers, and means for revolving said shaft.

8. In a combined harvesting and threshing machine, in combination, a main frame, a second frame pivoted at the front thereof, a sickle supported at the forward end of said second frame, levers pivotally supported from the main frame, a reel journaled in the outer ends of said levers, means connecting the pivoted frame directly with the levers, a tongue rigidly connected at the rear end of the main frame, a shaft transversely journaled on the main frame, drums carried by said shaft, a flexible connection between the levers and drums, a pinion fixed to said shaft, a lever having an arc meshing with said pinion, a standard carried by said tongue, and means for locking said last-named lever in adjusted position to said standard.

9. In a combined harvesting and threshing machine, a wheel-supported main frame, a beam rigidly connected to the main frame and projecting to one side thereof, a wheel supporting the outer end of the beam, a straw dump carried on the beam, means for cutting and threshing the grain and separating the straw therefrom, carried by the main frame, and means for delivering the straw to the dump.

10. In a combined harvesting and threshing machine, the combination of two upright wheel-supported truss frames downwardly and forwardly inclined at their outer end portions, a threshing mechanism arranged between and carried on said frames, having an elevator arranged approximately parallel to the inclined end portions of the frames, a second frame pivotally supported on the truss frames and having cutting means at the forward portion thereof, and a conveyer arranged on the second frame to deliver the grain from the cutting means to the elevator.

11. In a combined harvesting and threshing machine, the combination of two upright wheel-supported truss frames having downwardly and forwardly-inclined end portions, a second frame pivotally supported on the truss frames and having cutting means at the forward portion thereof, a threshing mechanism arranged between and supported on the truss frames, having an elevator at the downwardly and forwardly-inclined portions thereof, a casing supported on the truss frames and covering the threshing mechanism, and a conveyer carried on the second frame and extending between the cutting means and the elevator.

In testimony whereof I have signed my name to this specification in the presence of two subscribing witnesses.

GEORGE A. TUTTLE.

Witnesses:
J. A. PENN,
C. F. BREITHAUPT.